(12) United States Patent
Abt, Jr. et al.

(10) Patent No.: US 10,559,049 B2
(45) Date of Patent: Feb. 11, 2020

(54) DIGITAL PASSPORT COUNTRY ENTRY STAMP

(71) Applicant: International Business Machines Corporation, Armonk, NY (US)

(72) Inventors: William F. Abt, Jr., Nashua, NH (US); Daniel A. Gisolfi, Hopewell, NY (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 15/132,891

(22) Filed: Apr. 19, 2016

(65) Prior Publication Data

US 2017/0301052 A1    Oct. 19, 2017

(51) Int. Cl.
| | |
|---|---|
| *H04L 29/06* | (2006.01) |
| *G06Q 50/26* | (2012.01) |
| *H04L 9/00* | (2006.01) |
| *H04L 9/14* | (2006.01) |
| *H04L 9/30* | (2006.01) |
| *H04L 9/32* | (2006.01) |

(52) U.S. Cl.
CPC ........... *G06Q 50/265* (2013.01); *H04L 9/006* (2013.01); *H04L 9/008* (2013.01); *H04L 9/14* (2013.01); *H04L 9/302* (2013.01); *H04L 9/3066* (2013.01); *H04L 9/3249* (2013.01); *H04L 9/3263* (2013.01); *H04L 63/06* (2013.01); *H04L 63/0823* (2013.01); *H04L 2209/80* (2013.01)

(58) Field of Classification Search
CPC ................................. H04L 9/00; G06F 21/00
See application file for complete search history.

(56) References Cited

U.S. PATENT DOCUMENTS

| | | | |
|---|---|---|---|
| 8,281,148 | B2 | 10/2012 | Tuyls et al. |
| 8,904,181 | B1 | 12/2014 | Felsher et al. |
| 9,065,805 | B2 | 6/2015 | Redpath |

(Continued)

OTHER PUBLICATIONS

Beth, "Multifeature Security through Homomorphic Encryption", Advances in Cryptology—ASIACRYPT'94, Springer Berlin Heidelberg, 1995, vol. 917 of the series Lecture Notes in Computer Science, pp. 1-17, Sep. 8, 2005.

(Continued)

*Primary Examiner* — Joseph P Hirl
*Assistant Examiner* — Leynna T Truvan
(74) *Attorney, Agent, or Firm* — Scully, Scott, Murphy & Presser, P.C.; Michael O'Keefe, Esq.

(57) ABSTRACT

The method utilizes a passport identification number as an element of a homomorphic encryption used to stamp a passport with country entry/exit data to form a digital representation of a subset of information in the passport. As a result, exchange of the digital representation is permitted to allow a selective transfer of information without exposing a user-sensitive passport identification number. The homomorphic encryption comprises a support for exposing a trusted photo and a trusted group containing country travel entry and exit information. The digitally signed passport stamp may then be used to provide verification of the individual by ensuring linkage to that user's passport. The individual's identity and passport verification may occur unconnected, i.e., without having to connect to a central database.

20 Claims, 6 Drawing Sheets

(56) References Cited

U.S. PATENT DOCUMENTS

| | | | |
|---|---|---|---|
| 9,230,133 B2 | 1/2016 | Abt, Jr. et al. | |
| 2005/0193048 A1* | 9/2005 | Vaudenay | H04L 9/302 |
| | | | 708/400 |
| 2006/0075255 A1* | 4/2006 | Duffy | G06K 9/00885 |
| | | | 713/186 |
| 2010/0299002 A1* | 11/2010 | Abdallah | G06Q 50/265 |
| | | | 701/2 |
| 2010/0310070 A1* | 12/2010 | Bringer | G06F 21/32 |
| | | | 380/44 |
| 2013/0243266 A1* | 9/2013 | Lazzouni | G06K 9/00885 |
| | | | 382/115 |
| 2014/0289536 A1 | 9/2014 | Maccarthy et al. | |

OTHER PUBLICATIONS

Borhade et al., "Privacy Preserving Data Mining Using Association Rule With Condensation Approach", International Journal of Emerging Technology and Advanced Enfineering, vol. 4, Issue 3, Mar. 2014, pp. 292-296.

Failla, "Privacy—Preserving Processing of Biometric Templates by Homorphic Encryption", Diss. Ph.D. dissertation, PhD School in Information Engineering, University of Siena, Italy, Jan. 31, 2011.

Ibrahim et al., "A Generic, Scalable and Fine-grained Data Access System for Sharing Digital Objects in Honest but Curious Cloud Environments", 2013 International Conference on Cloud Computing and Big Data (CloudCom-Asia), IEEE 2013, Dec. 2013, pp. 15-22.

Peeters et al., "Privacy-Friendly Checking of Remote Token Blacklists", Policies and Research in Identity Managment, Springer Berlin Heidelberg, 2013, Third IFIP WG 11.6 Working Conference, IDMAN 2013, London, UK, Apr. 8-9, 2013. Proceedings, pp. 18-33.

* cited by examiner

-----BEGIN CERTIFICATE-----
MIIDSTCCAjGgAwIBAgIEVTZEYDANBgkqhkiG9w0BAQUFADBYMQswCQYDVQQGEwJV
UzELMAkGA1UECAwCTkMxDDAKBgNVBAcMA1JUUDEMMAoGA1UECgwDSUJNMSAwHgYD
VQQLDBdJQk0gRW1lcmdpbmcgVGVjaG5vbG9neTAeFw0xNTA0MjExMjM2NDhaFw0x
NzA0MjAxMjM2NDhaMFgxCzAJBgNVBAYTAlVTMQswCQYDVQQIDAJOQzEMMAoGA1UE
BwwDUlRQMQwwCgYDVQQKDANJQk0xIDAeBgNVBAsMF0lCTSBFbWVyZ2luZyBUZWNo
bm9sb2d5MIIBIjANBgkqhkiG9w0BAQEFAAOCAQ8AMIIBCgKCAQEAxBDJG2wACO4c
W5UOv98YmspwlNmRq7SwADLW2x59sEjLzQkTHo/orcAW6BI8UmAX5KAv1OSVNcop
3JLDIzkIMWPvQD7pgwQexYs4AirZPGQBbFMCyeSOVWYLJ001wpgVLa7BPT4hqPd5
wz6OvG9Yy/NveGdHCELjZ9n8RkYxcRzMvCkCMzvXYQECx7/FAP1aGygAYXcrYVEB
BrvUBB2rS7qYhRq6iWrN6cbRfiOkEuEDrqVRuMiYJw1jhF9B+PuPuK8BUgGdY6Tp
rZaq2afBGD7DWzolXoWvLsMlr6xAXt/kP/9q4yQQgS25aJDDNugGCT9qj32rHW0S
aAMILACZjQIDAQABoxswGTAXBgYrEgACEgYEDXF1aWNrYnJvd25mb3gwDQYJKoZI
hvcNAQEFBQADggEBADxt/g54B1jx5jYlboAyccqWBgUCCXwcoxrZH5Cqo3IS+jas
hEQPCFnCRun2tbxI//0GysHVFxcHMmb5AMVVr6Kj1lqMhIFY0cWh2el4Ei9d1/FT
H96DRdgYP9mXfNb1C7kp/TNG3THLP5MKEhYFXOGEs8m+9RuQn730QhahM7RpXU5j
QPsFUIyq1QPBIIZoVcNvaxYFE8mfS11Js3YuibuBguZbXWaU51f82r2sTk/awViw
ezh4P2UQczP5ZJTJpnw/4FtuKcD/euaXqM9LF8Egyon+PAk0tR+tPk9ydNQ4C25x
2WM5hS5a0R7Rqa+YS2zk3nvvbQzbN4H9XKvOb8E=
-----END CERTIFICATE-----

DIGITAL PASSPORT COUNTRY ENTRY STAMP

FIELD

The present disclosure relates to verification of digital data elements, and more specifically, to verifying the identity of a passport owner in possession of a digital passport country entry stamp data.

BACKGROUND

Cryptographic functions and algorithms can be used to help protect sensitive data, such as personal information about an individual. A first type of cryptographic function is a symmetric-key algorithm. Symmetric-key algorithms use the same cryptographic key for both encryption and decryption. Both the sending and receiving party should maintain the secrecy of the key in order to prevent a third party from gaining access to the encrypted information.

A second type of cryptographic function is an asymmetric-key algorithm. Asymmetric key algorithms can be used in a variety of manners. In one instance, a first party can encrypt data using a first (private) key. A second party can then decrypt the data using a second (public) key. This can be useful for verifying the source of the data as only the owner of the private key can encrypt data that will be decrypted using the associated public key. Alternately, the second party could encrypt data using the public key and the first party can then decrypt the data using its private key. This can be helpful to ensure that only the owner of the private key can decrypt the data. The use of two different keys can be useful for a variety of different applications. In some instances, the first party can use the private key to create a digital signature. The second party can then use the public key and digital signature to verify that the contents of the data were sent by the first party and have not been modified.

As currently known, the privacy of individual elements of a digital document is well secured using a Group Homomorphism for Digital Signature Algorithm (DSA). This enables the verification of privacy information in a secure manner so as to prevent access to information that is not required. Thus, digital identification documents are quite flexible and may be used for country of origin Passports. However, as known, Passports require a stamp of a date of entry.

SUMMARY

Embodiments are directed toward a method for generating and using a digital passport stamp. The stamp functions as a means for identity proof while protecting a user's sensitive passport information.

In one aspect, a method of verifying a user's passport. The method comprises: generating a first identity element comprising an integration of a unique user identifier data associated with the user's passport with an image file of a stamp associated with the user's passport that links the stamp to the user's passport; digitally signing the first identity element with one or more secret keys associated with a public key infrastructure a signature to create one or more digital signatures, the one or more digital signatures belonging to a trust group; and appending the one or more digital signatures to the image file; uploading the image file with the appended one or more digital signatures for storage to a mobile device associated with the user, wherein the image file and the appended digital signatures and the user provided unique identifier is used to verify a date of entry of the user in a country.

Certain embodiments are directed toward a system for verifying a user's identity based on a user's passport information. The system comprises: a memory storage device for storing instructions; a hardware processor device configured to run the instructions to configure the system to: generate a first identity element comprising an integration of a unique user identifier data associated with the user's passport with an image file of a stamp associated with the user's passport that links the stamp to the user's passport, the stamp revealing no sensitive information associated with the user; digitally sign the first identity element with and one or more secret keys associated with a public key infrastructure a signature to create one or more digital signatures, the one or more digital signatures belonging to a trust group; and append the one or more digital signatures to the image file; and upload the image file with the appended one or more digital signatures for storage to a mobile device associated with the user, wherein the image file and the appended digital signatures and the user provided unique identifier is used to verify a date of entry of the user in a country.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Aspects of the present disclosure provide a system and method for issuing and using an image or "stamp" associated with a user's sensitive passport information such that the stamp becomes linked to a user's passport that can be stored on an individual's electronic device. The digital stamp conveys no sensitive information about the user, however may be subsequently used to secure or verify a user's identification.

The stamp can be used to verify an individual's date of entry (e.g., into a country) and then therefore, a term and use by the individual person in the country. Besides a passport, the stamp may be associated with U.S. issued green cards to verify the individual's visiting term in the country.

Further, embodiments of the present disclosure are directed toward providing control over a user's passport identity information in a manner that can provide flexibility and security. For instance, government issued passports, "green" cards, work or travel visas, and the like, for users who travel and stay for durations of time in other countries or jurisdictions provide sensitive identity information. One use of a passport, for example, is to provide user identification. Typically, when a user enters a visiting country, the user's physical passport book is typically stamped with a passport entry "stamp" which is an image typically carrying a country of origin, e.g., a logo, and a date of entry, and/or other non-sensitive identifying indicia.

The physical passport of the individual is one mechanism of proof of that person's identity. However, this proof of identity needs to have a relationship to the entry stamp without revealing any sensitive information that may be on the passport, e.g., a passport identification number, or raising any privacy concerns. In the physical world model, the current process is simply to stamp the passport book with the entry stamp. This establishes a close relationship and the privacy information has not been reproduced. However, the stamp is in the passport book so security has not changed for managing the passport and any user data contained therein.

Further, it is the case that while in the visiting country, a potential employer may need to know that the user or individual has been granted a visa to prove he/she can work in the country and would use the visa or passport to verify an expiration date of a valid or authorized visitation period or travel duration within the visited country.

Aspects of the present disclosure facilitate the generation of a digital passport entry stamp having certain information, e.g., the user's name or likeness, and date of entry in the country, and use of the stamp for providing verification the passport stamp belongs to the unique passport ID number by linking to the passport.

In one embodiment, a digital grouping, or one or more sensitive data elements is maintained for that individual (user or traveler). One data element includes a digital passport stamp that can function in lieu, or in addition, to the user's passport by including similar but non-sensitive user information. The digital passport stamp element can be stored on an individual's electronic device such as, but not necessarily limited to, a smart phone, computer tablet, laptop computer, smart card, radio frequency identifier (RFID) card or personal computer.

In one embodiment, the digital stamp is a image file, e.g., a .PNG or a .JPG file, that can be stored on a mobile device for access, e.g., visualization, and may even be used in a social media network account, e.g., Facebook®, to show places that a person has traveled. As explained in greater detail herein, this stamp has a Digital Signature Algorithm (DSA) information associated with it that the a governmental agency, e.g., a U.S. Passport Agency, can verify and track entry term or duration of the person's stay in the country.

Further, the Stamp has a privacy value as there is no privacy information such as the Passport ID contained in the signed stamp. A challenger (e.g., a customs agent, an employer) must request the Passport ID number to verify the stamp. No stamps can be shared. Hence someone can collect their stamps of travel and even post them on any social media web site to friends. There is no sensitive information but the stamp can be verified trusted and known to belong to one person only.

In an implementation, the digital stamp is provided that can be openly used and provide no value of sensitive information other than prove its trust by a passport (customs) agent or like challenger to validate entry into the country by a unique individual. A person's name may be on the stamp with a date, but in the embodiments herein, the stamp is digitally signed with "doped" information of the user's passport number or a unique number for that individual which must be supplied upon a challenge by the agent to prove trust. The visual helps find the stamp clearly as well as provide use outside of the environment of the agent verification process.

For example, an employer may verify the stamp to prove a valid date of entry or duration of an individual (e.g., a potential employee) in the country. In such an embodiment, a potential employee can send the stamp, e.g., via an e-mail from the potential visiting employee or individual for purposes of verification and/or recording a work permit on record or file of a database.

In one embodiment, the digital stamp is issued by a government authority, and the issued digital stamp can be an image constructed of the country logo image, the user's name, and a date of entry into the jurisdiction, and it is digitally signed with that user's passport number added, thereby doping the original visual stamp. There is no information of that user's passport number or a stamp usage number. The user would have to present his/her passport to glean the unique passport number.

In the embodiments, the user's identity and passport verification may occur without connecting to a central database. In embodiments making use of a central database, these should only be accessed from within a controlled area.

In further embodiments, a public key may be given to any authenticator which does not have to be connected to any centralized system to verify the stamp of entry. Such an authenticator may be an employer, or a border control agent. In such embodiments, a verification device that can be remote from the central database can be configured to interact with the individual's electronic device to request, or query, the individual's electronic device for the digital passport stamp. The verification device can be configured to use digital signature modules that allow for the digital passport stamp to be verified with respect to the originator of the sensitive information (e.g., a governmental agency) issuing the user's passport.

In the embodiments described, the digital stamp becomes part of a trusted group homomorphism for a user's passport only and no other individual. In one embodiment, a singleton group homomorphism can be created and used in connection with digital signatures for the passport stamp information. The homomorphism can be useful for reducing concerns over privacy of the sensitive information. For instance, the group homomorphism can be used to ensure that, for the digital passport stamp information, a verifying party can confirm both the integrity of the data content of the stamp as belonging to their unique passport ID number and that they are for the same user or individual.

As all government issued passports, travel visa or work visa, etc. have an identification number (n) which is an element of privacy, it can be contained with the Group Homomorphism and is common between sensitive pieces of information that belong to the same individual and the same group.

As a non-limiting example, the unique passport ID number used for creating the trust group homomorphism could be alphanumeric numbers, numbers (binary, hex or otherwise). This identifier is used to create the group homomorphism and thereby allow individual pieces of information, e.g., a user's passport stamp, to be verified with respect to their individual passport.

In one embodiment, the use of a material equivalence of two groups having homomorphism defined as G→H to a unique identifier (n). In the case of a government issued passport, n is the unique passport identifier that is used in the DSA, is as follows:

$$\vartheta n(p+o) = \vartheta n(p) + \vartheta n(o)$$

where $\vartheta n(p)$ is a digital signature of the data that includes the unique identifier n, and for which there is a homomorphism for the data. For instance, the homomorphism can be represented by valid trust relationship for the digital signature of the combined sensitive elements (p+o) and also for the separate digital signatures of each element ($\vartheta n(p+o)$ and $\vartheta n(p) + \vartheta n(o)$ are each valid signatures).

For instance, a first data element (p) could represent an image file of a digital stamp, i.e., an image of a passport stamp, and a second data element (o) could represent the name of the individual. If function $\vartheta n$ is used to sign the combination of both data elements (p+o) to result in a trust group G. The function $\vartheta n$ can also be used to sign each data element with the unique passport identifier n to establish a group homomorphism to a group H as shown above. Consistent with embodiments, the unique passport ID number for that individual's passport can be used as the common homomorphism (n) for other types of sensitive data elements.

The trust for the data elements in groups G and H can thereby be equivalent pursuant to the group homomorphism.

A first group (G) could be created that is a combination of the stamp image and the unique identifier (e.g. passport ID number. A function can then be applied in which the common homomorphism, i.e., unique passport ID number (n), is included as part of the digital signature. A second group (H) can also be created by applying the function to any other sensitive data element individually. Consistent with certain embodiments, the common homomorphism is the unique identifier (n).

Figure 1:
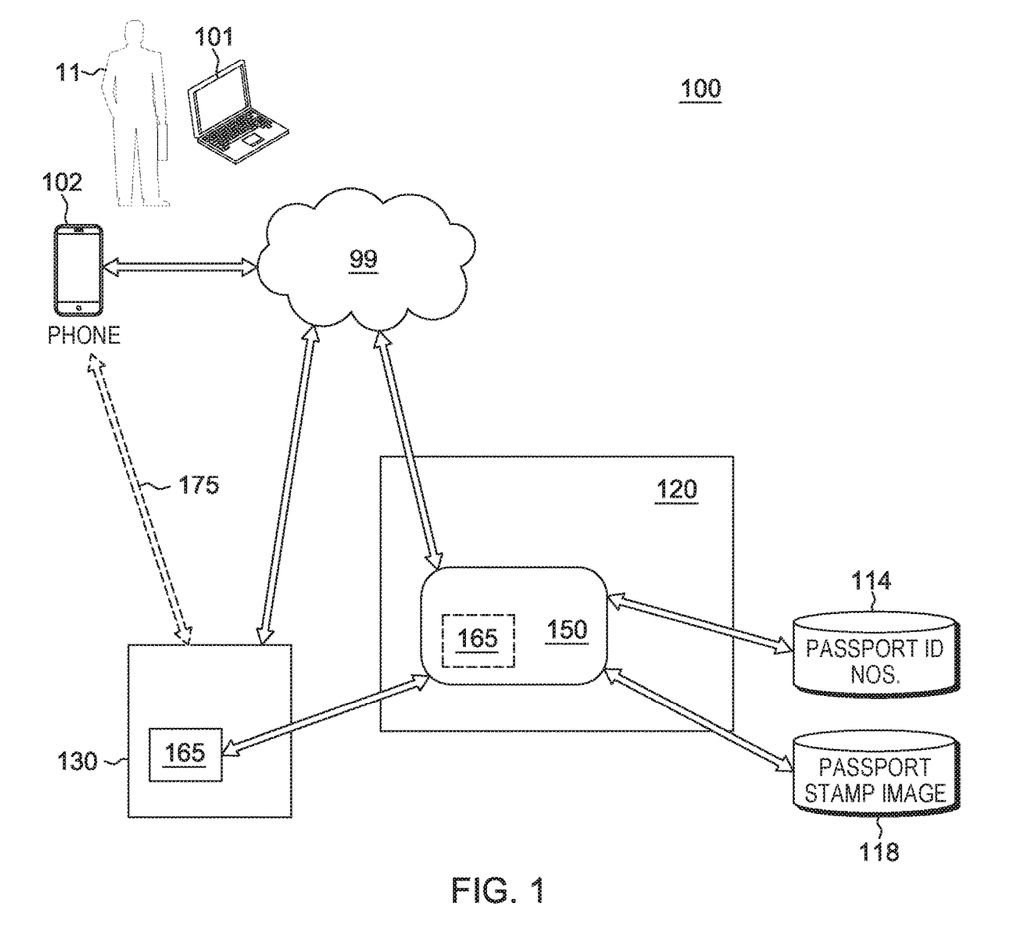
FIG. 1 depicts a block diagram of a system used for generating and using a digital passport stamp, consistent with embodiments of the present disclosure.

Turning now to the figures, FIG. 1 depicts a block diagram of a system 100 useful for generating a digital passport stamp, consistent with embodiments of the present disclosure. According to embodiments of the present disclosure, a trusted entity system 120 can be configured to provide information about an individual in the form of a sensitive piece of information about the individual. For instance, the trusted entity could be a government agency that traditionally issues passports, travel visas, work visa or similar items. A computer system of the trusted entity can access a database 114 that includes the sensitive pieces of information, e.g., an image file of a passport stamp, such as associated with a user's passport or other sensitive elements associated with users or individuals. Consistent with embodiments, the trusted entity can also use a set of identifiers for the individuals, which can be stored in identifiers database 118. As discussed herein, the identifiers can take a number of different forms including, but not limited to, alphanumeric characters, binary strings, image files and/or combinations thereof.

Consistent with embodiments, the trusted entity system 120 can include a signature creation module 150. Signature creation module 150 is configured and designed to use the digital stamp and identifier to create a homomorphism relative to trust for a first group in which a plurality of sensitive data elements may be analyzed as a single entity and trust for a second group in which the passport stamp data element are individually analyzed. For instance, the signature creation module 150 can be configured to use a function that signs each sensitive data element individually, but also using the identifier, e.g., passport ID number, for the corresponding individual for this signature creation. The signature creation module 150 can use a homomorphism that associates the passport identifier (ID) to any sensitive data element.

Figure 2:
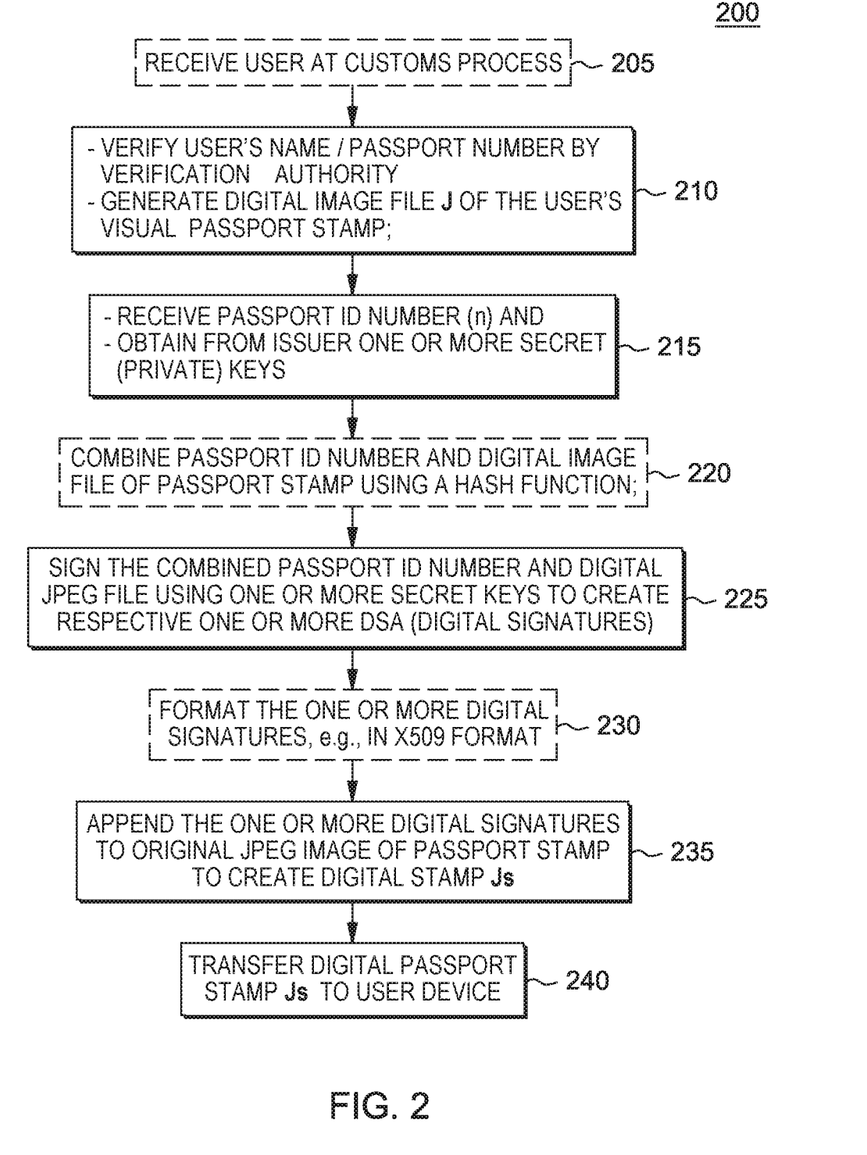
FIG. 2 depicts a flow diagram for generating a trust using the digital passport stamp consistent with embodiments of the present disclosure.

FIG. 2 depicts a flow diagram 200 for generating a trust using the digital passport stamp consistent with embodiments of the present disclosure.

According to embodiments, this process is initiated and/or implemented by a trusted entity system, such as the trusted entity system 120 of FIG. 1. In one embodiment, the process begins at 205 by a passport (customs) agent receiving a traveler/individual, e.g., at the airport or a country border. The individual has to provide the passport ID number with his/her real passport which validates the passport number belongs to that person's face. A digital stamp is then generated which is an image file "J" as shown at 210.

Figure 3A:
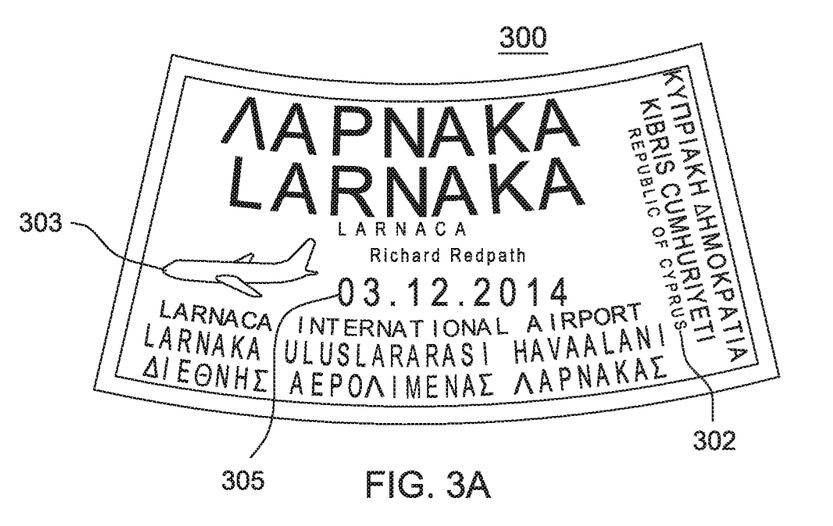
FIG. 3A depicts an example passport time stamp indicating a user's name and date or entry that have been added which does not provide a security issue.

As shown in FIG. 3A, visual elements of a user's passport stamp contained in the image file J, e.g., a passport stamp, may include, but are not limited to: textual data, indicia, and/or image data. For example, the passport stamp may include an image 300 of textual and graphic information such as the passport holder's name 301, a country of origin 302, an originating country logo 303, and/or a date of entry in the country 305 and/or expiration date (not shown).

Referring back to FIG. 2, at 215, the passport agent receives the user's passport ID number in addition to one or more secret private digital signature keys, e.g., from the trusted authority. As discussed herein, the identifier (n) is used to create a group homomorphism in which the trust relationship between a first group (G) of an entire set of sensitive information of the individual is maintained for a group (H) containing subsets of the entire set of sensitive information of the individual.

Thus, at 220, a function can be applied that integrates the identifier, i.e., the user's passport ID number with the current identity element for that user, i.e., the digital identity image file J (e.g., a jpeg or .png file) of the user's passport stamp. This integration can take a variety for different forms including, but not limited to, appending the identifier as a binary operation, appending the identifier in the image space or applying a more complex function (e.g., a hashing function) based upon these two inputs.

The output of the integrated combined (hash) of the Passport ID number and digital JPG file is an "identity element" that can then be digitally signed at 225 using one or more private keys to create respective one or more DSA (digital signatures). As discussed herein, the digital signature process can include the creation of a digest, which can then be encrypted using a private key encryption algorithm (e.g., consistent with DSS and DSA). Consistent with certain embodiments, the digest can be generated using a one-way (hash) function, such as secure hash algorithm-1 (SHA-1) or SHA-2.

At, 230, the digitally signed identity element (hash or digest) may then be formatted according to a well known packing protocol such as the International Telecommunications Union (ITU's) X509 format (e.g., version V3) and, at 235, may be appended to the original identity image file J forming the digital passport stamp Js.

Figure 3B:
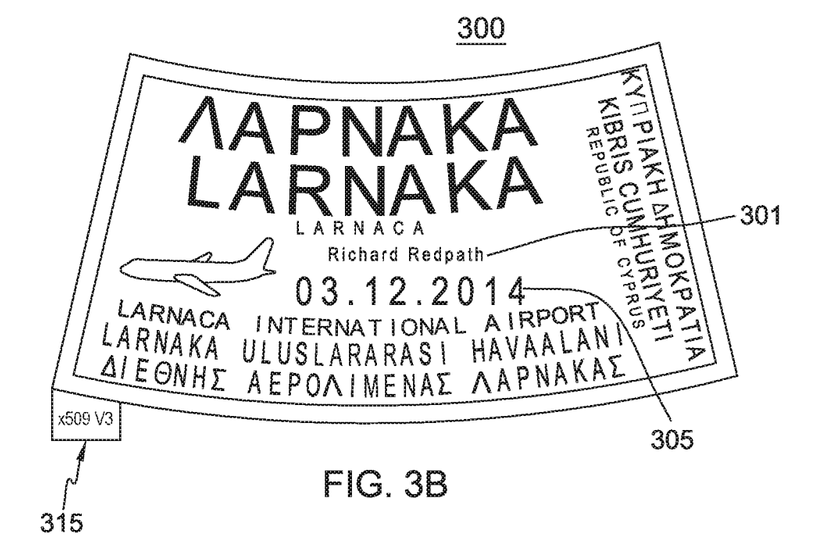
FIG. 3B depicts an example passport time stamp according to one embodiment that includes an appended digital signature.

FIG. 3B shows the sensitive element, i.e., digital passport stamp 300 of FIG. 3A having an appended signature file 315 such as shown in a known packing protocol format such as X509. The digital passport stamp having the appended signature file may be referred to herein as the signed digital passport stamp.

Thus in embodiments herein, at 225, a passport agent can use n as the unique identifier for the date stamp s and add it to the Group. The user's digital Identity has been augmented with this new file element 315 that can be viewed via the digital device which is the intent of digital identity. There is no trace of this passport ID number that can be gleaned.

A function ($\vartheta$ n) is defined to create the digitally signed Passport stamp Js according to equation 1) as follows:

$$Js = \vartheta\,(J, n, RSA_{sk}, EC_{sk}) \qquad 1)$$

where J is the JPG or PNG image of the passport stamp, n is the Passport Number; RSAsk is an RSA secret key; and ECsk is the Elliptical Curve secret key used signed by digital signal function.

Equation 1 reflects that more than one signature, i.e., multiple signatures, can be created using multiple current technologies as to enable a tighter security model and further prevent fraud. The process is shown below in which J is the JPG/PNG data, n is the Passport number, RSAsk is the secret key for use in creating a first RSA signature and ECsk is an elliptical curve technology that may be used to create another signature. Each of the RSA and EC signatures may be packaged according to the x509 standard for issuing certificates and appended to the JPG image. For example, two x509s can be appended to or one V3x509 may be used with an extension, i.e., an OID (Object Identifier) such as a numeric string, which can contain the signatures.

Thus, in embodiment herein, one or more, e.g., two, secret keys can be used for two different technologies for two signatures. In one embodiment, the Stamp Js will have an X509 appended to the PNG/JPG file as visually represented in FIG. 3B. This x509 can be extracted and the user's digital stamp can be verified. The x509, in one embodiment may have one or two or more signatures.

In one embodiment, a certification management server may be implemented by the customs agent, e.g., the IBM Mobile identity CMS (Certificate Management Server). In a non-limiting example, the CMS implements two POST commands that can be applied:
cms/api/v1/(sign|makex509)
   sign URL parameters are issuername and the MD pairs (RSA, EC) issuer=xxx&data=pairs
   makex509 URL parameters is the V3 extension data octet-stream The digital stamp Js thus requires a unique identifier (singleton group homomorphism) for the person, e.g., the SHA2 (i.e., message digest) of the user's unique Passport ID Number combined with the original identity stamp image file J, to create signatures for the Stamp Image data produced by a branding server and these signatures are inserted in the V3 extension data to the x509 which is appended to the JPG image. In one embodiment, the stamp creation needs for data: 1. Unique identifier (passport number combined with original stamp image to create a message digest, e.g., SHA2); and 2. A JPG file data.

The end result is a V3 x509 appended to the JPG file which has V3 data of the EC and RSA signatures. This data may be formatted into the V3 x509 as signature pairs or "detached" signatures. The stamp is a JPG file with an x509 appended such as shown in FIG. 3B. Thus, the stamp creation process is depicted as follows:

Passport ID number+JPGfile→JPGx509v3

Figure 5:
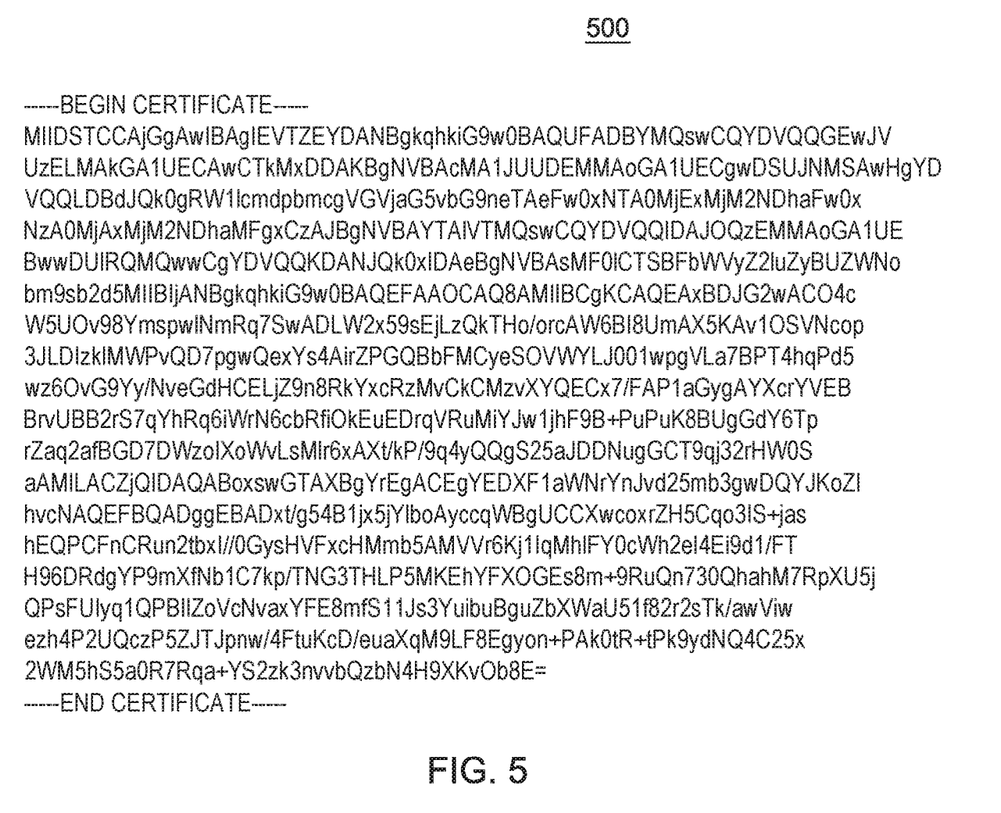
FIG. 5 depicts an example x509 certificate that is appended to a digital image file of the passport stamp in an example embodiment.

This is the x509 that would be appended to the JPG file and, as shown in the example x509 certificate 500 of FIG. 5, a "Begin Certificate" would be found by a scan of the content.

Referring back to FIG. 2 at 240, the signed digital passport stamp having appended signature element can then be provided, or uploaded, to one or more of a variety of electronic devices including, but not limited to: a mobile phone such as a smart phone device 101, a personal computer device 102, a tablet, an RFID card, or smart card which can be owned by the individual 11 corresponding to the sensitive data elements via a communication link. Each device can store a sensitive element, e.g., a digitally signed image file of the passport stamp, along with a corresponding identifier, i.e., a passport identifier number. The digitally signed passport stamp may then be used to provide verification of the individual by ensuring linkage to that user's passport such as issued by the trusted entity 120.

In this manner, the user's unique passport ID number is prevented from being disseminated and yet this information is used to attach a relationship of ownership. In this embodiment, the user's passport stamp is created and doped with information unique to that individual, i.e., the passport ID number, and digitally signed thus providing a unique relationship to that person. A digital signature algorithm (DSA) is the signing mechanism and is used to simply prove that the data is indeed original data and has not been modified.

Referring back to FIG. 1, in certain embodiments, a verification device 130, such as associated with a challenger or verifying entity, can be configured to establish a communication link with one or more of the user's electronic devices 101, 102. This link can be made over a variety of different mediums and using various protocols including, but not limited to, the use of networks 99 (e.g., local area networks, wide area networks, the Internet and combinations thereof), direct communication links 175 (e.g., near field communication (NFC), Bluetooth, IEEE 802.xx and combinations thereof). In certain embodiments, the verification device 130 can include a computer server, a handheld device or other electronic devices.

According to embodiments, verification device 130 can query the electronic device 101 or 102 for the signed digital passport stamp and/or the unique passport identifier number. In response to such a query, the electronic device 101, 102 can provide the signed digital passport stamp element along with the associated identifier, i.e., unique passport ID number. The verification device 130 can be configured to apply a digital signature (public key) function that takes advantage of the singleton group homomorphism created by the use of the associated identifier. This can facilitate the ability to verify trust that the user's digital passport stamp is associated the passport belonging to that user.

Figure 4:
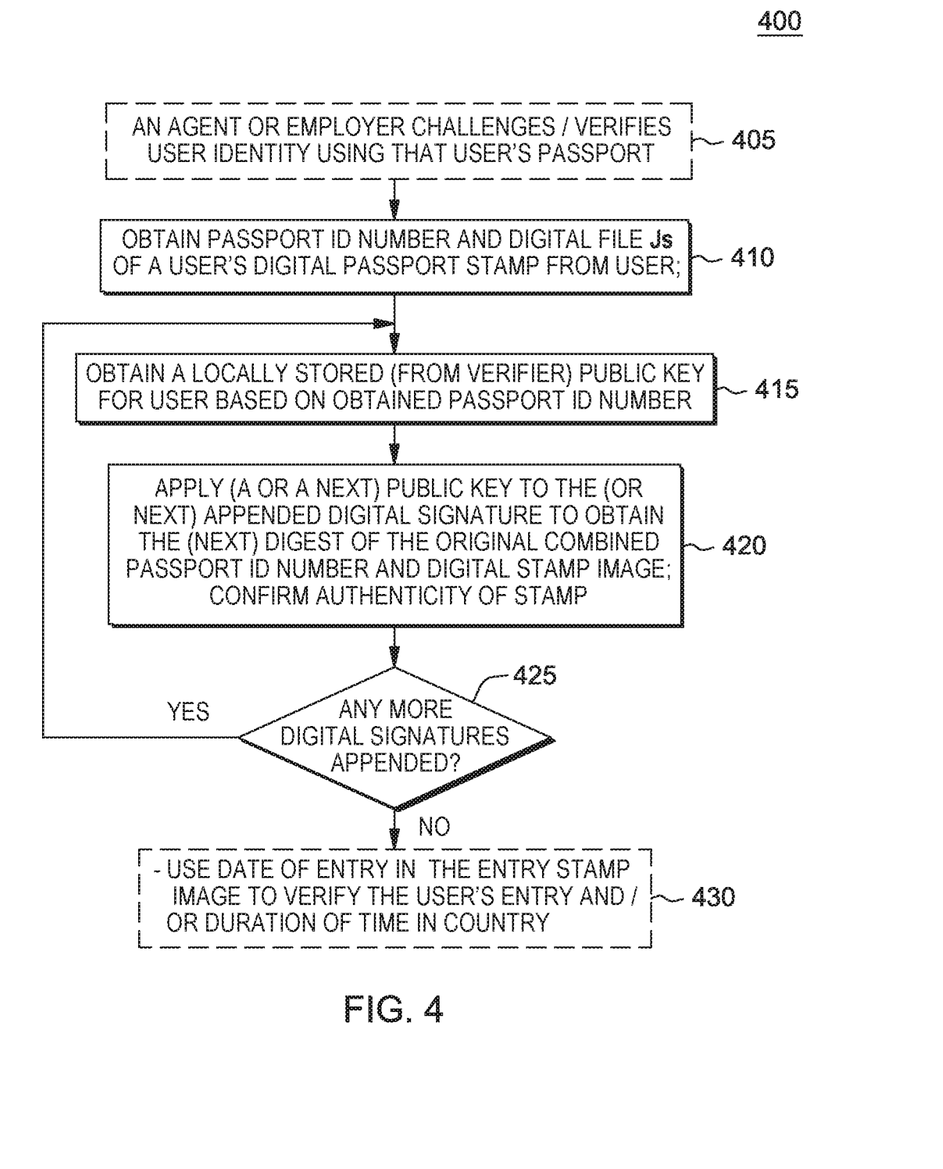
FIG. 4 depicts a flow diagram implemented by a challenger for verifying that a user's digital passport stamp is linked to the at user's passport.

FIG. 4 depicts a flow diagram of a method 400 for verifying trust of the user's digital passport stamp as representative of a valid user passport of an individual, consistent with embodiments of the present disclosure. An individual's electronic device 102 can store the digital passport stamp having the appended X509 formatted digital signature(s) such as generated by the DSA in a manner that creates a singleton group homomorphism. In other embodiments, these processes may be part of a group homomorphism related to the trust between other (additional or different) sensitive elements. In embodiments, these other sensitive elements can contain data about the individual (e.g., one or more of: a name, an address, a date of birth, license status, an image of the individual, a driver's license number, an expiration date and physical characteristics of the individual) in a manner as described in commonly-owned U.S. Pat. No. 9,230,135, the content of which is incorporated by reference as if fully set forth herein.

In FIG. 4, at 405, a challenger, e.g., an agent at a country's border, challenges a user entering the country. Further, an employer may use the system to verify that the user's permitted visa term or duration has not expired. Thus, at 405, the user provides the passport ID number with his/her real passport which validates the passport number belongs to that user. The next step is to validate that the stamp belongs to that passport number. Thus, in one embodiment At 410, a verification (computing) device 130 can be used by a challenger to receive the signed digital passport stamp element Js and the unique user passport ID number from the user either directly (e.g., via direct near field communications link or via a communications link over the network 99) or in response to a query. In one embodiment, as shown in FIG. 1, the authenticator or verification device 130 may receive (e.g., from the trusted entity 120) and may locally store in advance, or access, e.g., in real time, a corresponding public key 165 associated with the signed digital passport stamp. Public keys corresponding to travelers or individuals granted temporary stay in a country may be given to any verifier device for storage in a memory device thereat. Thus, in embodiments herein, the verifier or authenticator does not have to be connected on-line to any centralized system to verify the stamp date of entry. Receipt of the public key associated with the private key(s) used in generating that user's digital stamp is depicted at 415, FIG. 4. At 420, a verification function can then be applied to confirm the authenticity of both the data and the trust between the digital passport stamp and that user's passport.

Verifying that the user or owner presenting the passport stamp with the date of entry entails applying corresponding public keys RSAx509, ECx509 to the digital passport stamp Js and verifying the date of entry of the image owner using the n passport identifier is depicted in accordance with equation 2) as follows:

$$\text{trust}=\text{Verify}(Js,n,\text{RSAx509},\text{ECx509}) \quad 2)$$

For instance, at 420, the applied function can use the appended digital signature to create a corresponding 1st digest of the combined original stamp image file J and the unique password identification number. Using a signature protocol, such as Digital Signature Standard (DSS) and corresponding algorithm (e.g., digital signature algorithm (DSA)), the first digest is generated by applying the public key of the trusted entity to decrypt the corresponding appended signatures. In the embodiments herein, a first public key obtained may correspond to and decrypt the RSAx509 signed signature to obtain the digest. The verification device may then determine that the user's digital passport stamp corresponds to that user's passport.

In the embodiments where two digital signatures may be created using two different technologies thereby preventing a single point a single point of failure to compromise the security, each signature verification will produce the original same digest. Thus, continuing at 425, FIG. 4, a decision is made as to whether the digital passport entry stamp includes any more appended digital signature(s). If it is determined additional signatures exist, then the process returns to step 415 and steps 415 and 420 are repeated to generate the original same digest. For example, in a second iteration, at 415, the verification device can verify the passport entry stamp authenticity using a second public key, e.g., for decrypting the ECx509 signed signature to obtain the same digest of the combined original stamp image file J and the unique password identification number. Consistent with certain embodiments, one digest (only) which is the Stamp data and the Passport Number has been generated, e.g., using the same one-way (hash) function, such as secure hash algorithm-1 (SHA-1) or SHA-2. The digest can also be generated using a function that takes advantage of the homomorphism derived from the use of the identifier with the digital stamp.

In either case, at 420, FIG. 4, the verifier is notified of the results of the verification using a variety of different indicators. These can include, but are not necessarily limited to, displaying text or graphics (e.g., "fail" or "success"), generating audio (e.g., tones or voice), showing a visual disparity between two digests (e.g., disparity of the passport identification data) given by the user.

Then, when it is determined that there are no more appended digital signatures, and the verification device determines that the user's digital passport stamp corresponds to that user's passport, at 430, the agent or other challenging entity user (e.g., employer) will verify the user's date of entry and validity thereof and the process ends.

Consistent with embodiments, the digest can be created for each the passport stamp image file using a digest function. As discussed herein, the digest function can include the use of a hash function and can create a homomorphism by adding the identifier (n) to each piece of sensitive information to create an identity element and before creating the corresponding digest. The digest function can append, or otherwise add, the identifier (n) to the data content of the digital stamp to create a "doped" digital stamp image (to create an identity element) before applying a hash function, such as SHA-1 or SHA-2. This integration could be at the binary level, or at an image level (e.g., by merging the image of the identifier with an image of content of the sensitive data) or at other levels. The signature module can then encrypt each digest using one or more private key encryption algorithms, e.g., in order to generate the digital signatures.

The resulting signatures can be provided along with the sensitive elements and identifiers to the proper individuals. For instance, the traveler or visitor could receive a smart card that stores this information. The information could also be uploaded to an electronic device, such as a smart phone, tablet or computer. A software application could also be loaded onto the electronic device in order to coordinate communications with a verification device.

The certification or verification agency will make available a public key that can be handed out and anyone can prove the trust of the stamp (i.e., disconnected, with no Internet needed). The employer can have a user's passport number and all the user would have to do is e-mail the stamp to prove re-validation, such as may be needed for purposes of working in the country.

A user can collect stamps (digital images) as they have no privacy value.

In an alternate embodiment herein, there may be defined a universal stamp usage number for a user's unique your passport ID number. Thus, a user would now have two numbers: the stamp usage number can be used for stamps and signed to be trusted by a PKI. The stamp can be a JPG image of the Country logo image, a user's name, an expiration date and a stamp usage number clearly presented on the image. A certification or verification agency can make available a public key that can be handed out and anyone can prove the trust of the stamp. In such an embodiment, the proof of trust is still performed in a disconnected, no internet needed. Then to prove it belongs to the user's passport, the user can show his/her passport or the digital passport which has this stamp usage number.

Thus in an alternative embodiment herein, there is contemplated implementing a DSA-signed stamp with a usage stamp number that belongs to a passport and providing a public key to anyone for use in proving it. The stamp usage number is shown on the user's passport of which the user must have to link the trust of the stamp to that user's passport. They belong to each other. Such a new architecture is provided that is added to a passport today. The stamp usage number is a privacy element that presents less of a privacy issue than, for example, say revealing a user's passport number.

Once the JPG is created it can be simply displayed and emailed as well as posted of the travel place. The Passport agent can receive this JPG and given the passport number of the individual, the Agent can prove the stamp is valid for the entry period simply by extracting the x509 and checking the signatures.

Figure 6:
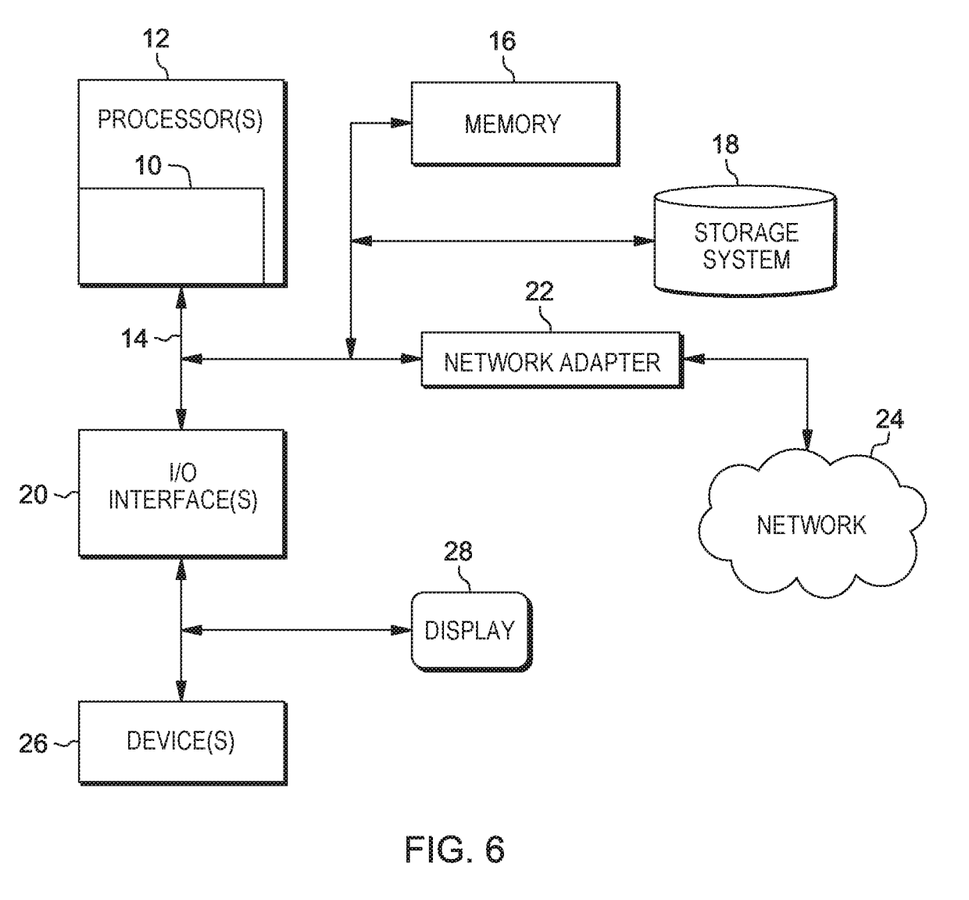
FIG. 6 depicts a schematic of an example computer or processing system that may implement the methods consistent with embodiments of the present disclosure.

FIG. 6 illustrates a schematic of an example computer or processing system that may implement the digital passport stamp generation process and verification device processes in embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of verifying a user's passport comprising:

generating a first identity element comprising an integration of a unique user identifier data associated with the user's passport with an image file of a stamp having indicia indicating a date of entry of the user in a country and provided with the user's passport, said first identity element generated by applying a group homomorphism function to a combination of the stamp image and the unique user identifier data that links the stamp to the user's passport to form a trusted group homomorphism for only the user's passport, said stamp revealing no sensitive information associated with the user;

digitally signing the first identity element with one or more secret keys associated with a public key infrastructure to create one or more digital signatures, said one or more digital signatures belonging to the trust group; and appending the one or more digital signatures to the image file of said stamp;

uploading the image file of said stamp with the appended one or more digital signatures for storage to a mobile device associated with the user, wherein the image file of said stamp and the appended digital signatures and the user provided unique user identifier data is used to verify a date of entry of the user in a country with one or more other digital signature elements that used the unique user identifier data as a trust group belonging to the stamp image file.

2. The method of claim 1, wherein said group homomorphism function comprises
a cryptographic hash function.

3. The method of claim 1, wherein said verifying comprises:

providing the image file of said stamp with appended digital signatures and the user's unique identifier data to a computing device associated with a verifier entity;

obtaining at the computing device associated with the verifier entity, based on said user's unique identifier, a public key associated with each said one or more digital signatures;

decrypting at the computing device a said appended digital signature using a corresponding obtained said public key to obtain a second identity element, and verifying linking of the image of the associated stamp to the user's passport at the computing device using said received user's unique identifier data and image file of said stamp.

4. The method of claim 3, wherein said first identity element is a digest obtained by integrating the unique user identifier data associated with the user's passport with an image file of the stamp, said verifying linking of the image of the associated stamp to the user's passport comprises:

determining, at the computing device, that the first identity element matches the second identity element generated by said decrypting said appended digital signature, wherein a match of said first identity element and second identity element verifies the image file of the stamp links to that user's passport thereby verifying ownership.

5. The method of claim 1, wherein said appending comprises:

inserting each digital signature as a file extension data according to an x509 certificate issuing protocol.

6. The method of claim 1, wherein said one or more secret keys for digitally signing the first identity element comprises: an elliptical curve key and an RSA key.

7. The method of claim 3, further comprising: obtaining and storing said public key associated with each said one or more digital signatures locally at a memory device associated with said verifier device.

8. A system for verifying a user's identity based on a user's passport information comprising:

a memory storage device for storing instructions;

a hardware processor device configured to run the instructions to configure the system to:

generate a first identity element comprising an integration of a unique user identifier data associated with the user's passport with an image file of a stamp having indicia indicating a date of entry of the user in a country and provided with the user's passport, said first identity element generated by applying a group homomorphism function to a combination of the stamp image and the unique user identifier data that links the stamp to the user's passport to form a trusted group homomorphism for only the user's passport, said stamp revealing no sensitive information associated with the user;

digitally sign the first identity element with one or more secret keys associated with a public key infrastructure to create one or more digital signatures, said one or more digital signatures belonging to a trust group; and append the one or more digital signatures to the image file of said stamp; and upload the image file of said stamp with the appended one or more digital signatures for storage to a mobile device associated with the user, wherein the image file of said stamp and the appended digital signatures and the user provided unique user identifier data is used to verify a date of entry of the user in a country with one or more other digital signature elements that used the unique user identifier data as a trust group belonging to the stamp image file.

9. The system of claim 8, wherein said group homomorphism function comprises
a cryptographic hash function.

10. The system of claim 8, wherein to verify the user identity, the processor device is further configured to:

provide the image file of said stamp with appended digital signatures and the user's unique identifier data to a computing device associated with a verifier entity;

obtain at the computing device associated with the verifier entity, based on said user's unique identifier, a public key associated with each said one or more digital signatures;

decrypt, at the computing device, a said appended digital signature using a corresponding obtained said public key to obtain a second identity element, verify a linking of the image of the associated stamp to the user's passport at the computing device using said received user's unique identifier data and image file of said stamp.

11. The system of claim 10, wherein said first identity element is a digest obtained by integrating the unique user identifier data associated with the user's passport with an image file of the stamp, and to verify the linking of the image of the associated stamp to the user's passport, said processor device is further configured to:

determine that the first identity element matches the second identity element generated by said decrypting said appended digital signature, wherein a match of said first identity element and second identity element verifies the image file of the stamp links to that user's passport thereby verifying ownership.

12. The system of claim 9, wherein to append, the processor device is further configured to:
insert each digital signature as a file extension data according to an x509 certificate issuing protocol.

13. The system of claim 9, wherein said one or more secret keys for digitally signing the first identity element comprises one or more of: an RSA key or an elliptical curve key.

14. The system of claim 10, wherein said public key associated with each said one or more digital signatures is obtained and stored locally at a memory device associated with said verifier device.

15. A non-transitory computer readable storage medium storing a program of instructions executable by a machine to perform a method of verifying a user's identity based on a user's passport information, the method comprising:
generating a first identity element comprising an integration of a unique user identifier data associated with the user's passport with an image file of a stamp having indicia indicating a date of entry of the user in a country and provided with the user's passport, said first identity element generated by applying a group homomorphism function to a combination of the stamp image and the unique user identifier data that links the stamp to the user's passport to form a trusted group homomorphism for only the user's passport, said stamp image revealing no sensitive information associated with the user;
digitally signing the first identity element with one or more secret keys associated with a public key infrastructure to create one or more digital signatures, said one or more digital signatures belonging to the trust group; and
appending the one or more digital signatures to the image file of said stamp;
uploading the image file of said stamp with the appended one or more digital signatures for storage to a mobile device associated with the user,
wherein the image file of said stamp and the appended digital signatures and the user provided unique user identifier data is used to verify a date of entry of the user in a country with one or more other digital signature elements that used the unique user identifier data as a trust group belonging to the stamp image file.

16. The non-transitory computer readable storage medium of claim 15, wherein said group homomorphism function comprises comprises:
a cryptographic hash function.

17. The non-transitory computer readable storage medium of claim 15, wherein said verifying comprises:
providing the image file of said stamp with appended digital signatures and the user's unique identifier data to a computing device associated with a verifier entity;
obtaining at the computing device associated with the verifier entity, based on said user's unique identifier, a public key associated with each said one or more digital signatures;
decrypting at the computing device a said appended digital signature using a corresponding obtained said public key to obtain a second identity element, and
verifying linking of the image of the associated stamp to the user's passport at the computing device using said received user's unique identifier data and image file of said stamp.

18. The non-transitory computer readable storage medium of claim 17, wherein said first identity element is a digest obtained by integrating the unique user identifier data associated with the user's passport with an image file of the stamp, said verifying linking of the image of the associated stamp to the user's passport comprises:
determining, at the computing device, that the first identity element matches the second identity element generated by said decrypting said appended digital signature, wherein a match of said first identity element and second identity element verifies the image file of the stamp links to that user's passport thereby verifying ownership.

19. The non-transitory computer readable storage medium of claim 18, wherein said one or more secret keys for digitally signing the first identity element comprises: an elliptical curve key and an RSA key.

20. The non-transitory computer readable storage medium of claim 17, further comprising: obtaining and storing said public key associated with each said one or more digital signatures locally at a memory device associated with said verifier device.

* * * * *